United States Patent [19]

Hughes et al.

[11] Patent Number: 5,065,409
[45] Date of Patent: Nov. 12, 1991

[54] FSK DISCRIMINATOR

[75] Inventors: Patrick M. Hughes, Felixstowe; Martin C. Hall, Ipswich; Larry F. Lind, Colchester, all of England

[73] Assignee: British Telecommunications public limited company, Great Britain

[21] Appl. No.: 354,435

[22] PCT Filed: Aug. 19, 1988

[86] PCT No.: PCT/GB88/00687

§ 371 Date: May 3, 1989

§ 102(e) Date: May 3, 1989

[87] PCT Pub. No.: WO89/01726

PCT Pub. Date: Feb. 23, 1989

[30] Foreign Application Priority Data

Aug. 21, 1987 [GB] United Kingdom ............... 8719849

[51] Int. Cl.$^5$ ............................................ H04L 27/14
[52] U.S. Cl. .................................... 375/91; 329/300; 329/327
[58] Field of Search ............ 375/45, 80, 81, 88, 375/91, 94; 329/105, 110, 126, 166

[56] References Cited

U.S. PATENT DOCUMENTS

| | | |
|---|---|---|
| 3,803,501 | 4/1974 | Jones, Jr. .............................. 375/80 |
| 4,437,068 | 3/1984 | Picquendar ......................... 329/104 |
| 4,475,219 | 10/1984 | Puckette ............................... 375/88 |
| 4,479,092 | 10/1984 | Falconer ............................... 375/94 |
| 4,568,882 | 2/1986 | Single .................................. 329/105 |
| 4,726,041 | 2/1988 | Prohaska ............................. 375/91 |
| 4,755,761 | 7/1988 | Ray, Jr. ................................ 375/80 |

OTHER PUBLICATIONS

C. J. Waylan et al., "Detection on Fast, Noncoherent, Frequency-Hopped", see FIG. 3, IEEE Transactions on Communications, vol. 23, No. 5, May 1975, IEEE (New York, U.S.).

Primary Examiner—Stephen Chin
Attorney, Agent, or Firm—Nixon & Vanderhye

[57] ABSTRACT

The outputs of two filter channels for accepting two keying frequencies are compared to produce the output. Each channel uses finite impulse response transversal filters; preferably with an impulse response of duration comparable with the symbol period of the incoming signal. Each channel has a pair of filters for accepting phase quadrature components (or, alternatively, quadrature synchronous demodulators followed by filters); the filter coefficients differ from sinusoidal by (or, in the alternative case, are formed by) a modification function which is the same for both filters of the pair.

14 Claims, 5 Drawing Sheets

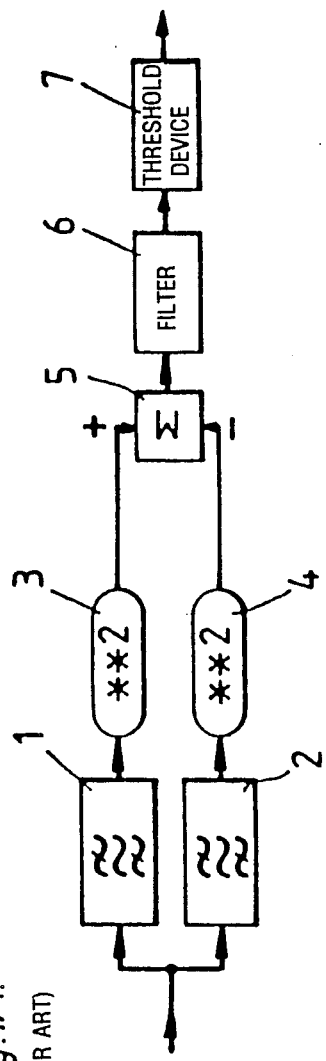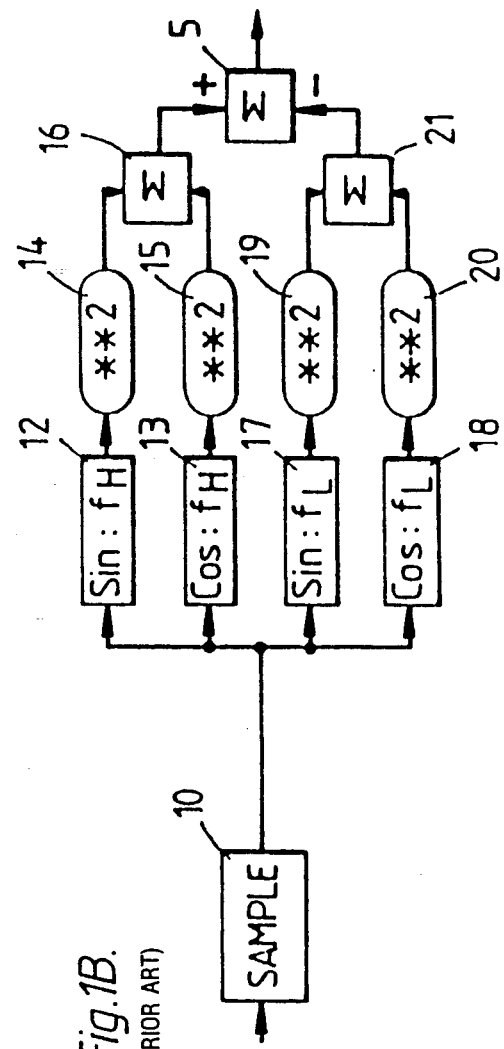
Fig.1A. (PRIOR ART)
Fig.1B. (PRIOR ART)

FSK DISCRIMINATOR

BACKGROUND OF THE INVENTION

1. Field of the Invention

The present invention relates to discriminators for frequency shift keyed signals.

2. Description of the Prior Art

In 2-frequency fsk modulation, an on-off modulating signal is used to switch between a higher ($f_H$) and a lower ($f_L$) frequency, usually in a continuous phase manner. The general structure of a discriminator (FIG. 1A) is well known and comprises bandpass filters 1, 2 tuned to the two frequencies $f_H$, $f_L$, respectively. The modulus of the filter outputs is taken by rectifiers or (as shown) squaring circuits 3, 4, whose outputs are then subtracted at 5 to provide the demodulated output which may be further filtered at 6 to reduce high frequency ripple. The filtered signal is then converted to a square wave by a thresholding device 7.

It has also been proposed (see U.S. Pat. No. 4,437,068) to employ finite impulse response transversal filters, as illustrated in FIG. 1B. That the input signal is in the form of signal samples is illustrated by a sampler 10.

In the general case, because of the phase-sensitive nature of the FIR filter, quadrature pairs are used with vector summation of the outputs are used. Thus in FIG. 2 the higher frequency is handled by filters 12, 13 having tap coefficients which are sine and cosine functions of the tap number. The filter outputs are squared (14, 15) and summed (16).

Filters, squarers and an adder (17-21) are provided in like manner for the low frequency channel, the coefficients again being sine and cosine function of tap number but with a period corresponding to the lower frequency.

As the filter outputs have already been squared, the outputs are supplied directly to the subtractor 5.

SUMMARY OF THE INVENTION

According to one aspect of the present invention there is provided a discriminator for frequency shift keyed signals comprising first filter means for accepting a first keying frequency, second filter means for accepting a second keying frequency, and a subtractor for generating the difference between the outputs of the filter means, each filter means comprising a pair of finite impulse response filters for accepting signal components which are mutually in phase quadrature and means for forming the sum of an even function of the output of each of the two filters of the pair, characterised in that each filter response is defined by a set of coefficients and the filters of the first pair have coefficients $$a_{Hk} = r_{Hk} \sin (2\pi f_H k/f_s + \phi_H)$$

$$b_{Hk} = r_{Hk} \cos (2\pi f_H k/f_s + \phi_H)$$

and those of the second set $$a_{Lk} = Kr_{Lk} \sin (2\pi f_L k/f_s + \phi_L)$$

$$b_{Lk} = Kr_{Lk} \cos (2\pi f_L k/f_s + \phi_L)$$

where k is the coefficient number, $f_H$ and $f_L$ are substantially equal to the keying frequencies, $\phi_H$ and $\phi_L$ are constants, $f_s$ is the sampling frequency at which the first and second keying frequencies are sampled, K is a normalising factor and $r_{Hk}$, $r_{Lk}$ are sets of values, for the respective pairs, representing a modification function.

In another aspect, the invention provides a discriminator for frequency shift keyed signals comprising first filter means for accepting a first keying frequency, second filter means for accepting a second keying frequency, and a subtractor for generating the difference between the outputs of the filter means, characterised in that each filter means comprises: a pair of multipliers and means for supplying to the multipliers of the pair reference signals, mutually in phase quadrature, at the keying frequency which that filter means is to accept, each multiplier being followed by a finite impulse response filter, the two filters having the same response, representing a modification function, and means for forming the sum of an even function the output of each of the two filters of the pair.

Other optional features of the invention are defined in the sub-claims appended.

BRIEF DESCRIPTION OF THE DRAWINGS

FIG. 1A is a schematic illustration of the general structure of an fsk discriminator of the prior art;

FIG. 1B is a schematic illustration of the general structure of an fsk discriminator of the prior art employing finite impulse response transversal filters;

DESCRIPTION OF THE PREFERRED EMBODIMENTS

Figure 2:
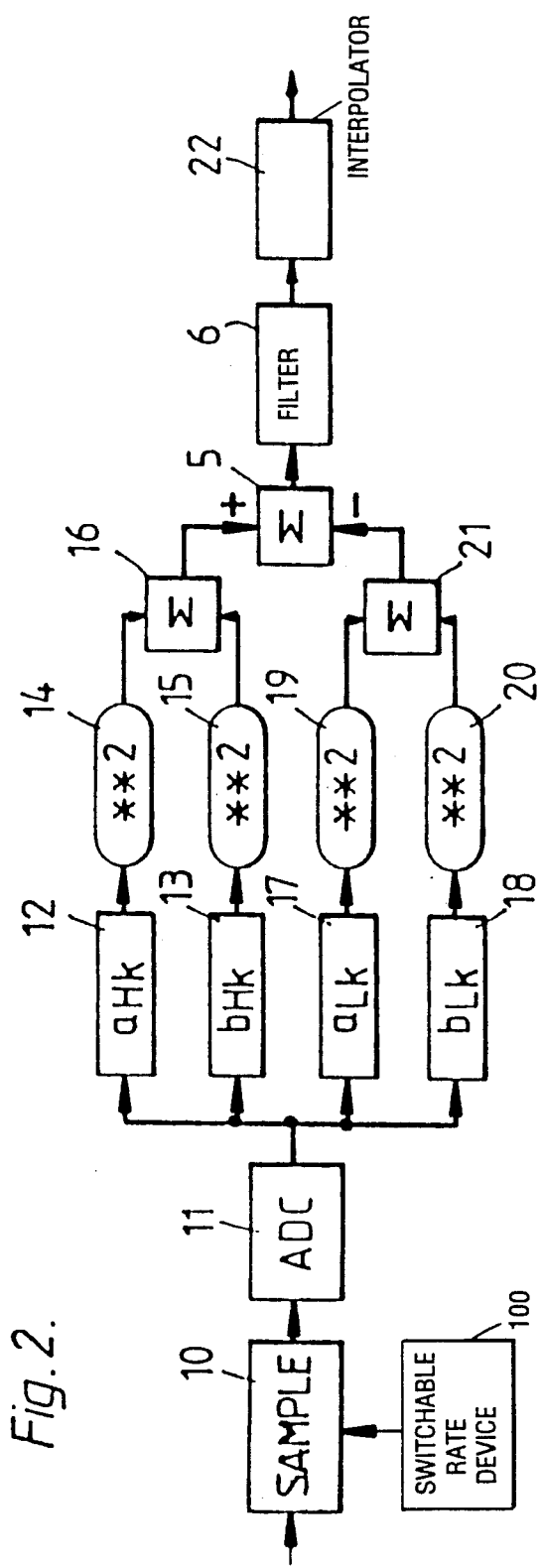
FIG. 2 is a block diagram of one form of fsk discriminator according to the invention.

The discriminator shown in FIG. 2 is basically similar to that depicted in FIG. 1B; similar items carry the same reference numerals. The preferred implementation is digital and therefore an analogue to digital converter 11 is also included, although filters employing charge coupled devices (ccd) which use sampled analogue voltage (or charge) values could also be used.

Figure 3:
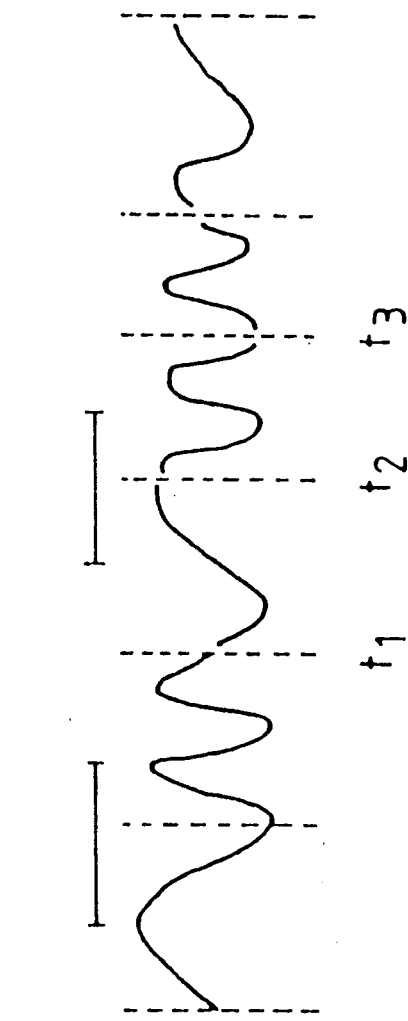
FIG. 3 illustrates a typical idealised input waveform.

To assist further description, the format of a 2 fsk signal is shown in FIG. 3. Successive bits of the modulating signal are represented in successive symbol periods, of duration T (i.e. a baud rate of 1/T) by the higher or lower frequency $f_H$ or $f_L$ according to whether the bit is '0' or '1' (or vice versa). In general, the frequencies used need not be harmonically related to the baud rate and hence the signal phase at the intersymbol transitions will vary, as can be seen in the figure. Usually, the phase is continuous across transitions (i.e. no amplitude jump occurs). One symbol period may contain less than one, one, or more than one, complete cycle of the keyed frequency.

Clearly, in order to discern the frequency within a symbol period, the sampling rate used must provide several samples of the signal during that period. The sampling rate may, but need not, be a multiple of the baud rate; likewise its phase need not be related to the phase of the inter-symbol transitions (the latter usually being unknown at the discriminator input). As an example for a V23 (CCITT standard) forward channel at 1200 baud with frequencies $f_H = 2100$ Hz and $f_L = 1300$ Hz a 9600 Hz sampling frequency may be used (i.e. 8 samples per symbol period).

One objective of the design of the discriminator shown in FIG. 2 is to reduce distortion in the demodulated output. There are a number of ways of expressing the distortion. Where, in this specification, reference is made to a distortion criterion, any desired measure of distortion may be employed. Quoted distortion figures, however, are for isochronous distortion—viz the peak-to-peak temporal scatter $\Delta T$ of the zero-crossings of the discriminator output, expressed as a percentage of the symbol period T—this is illustrated in the eye diagram of FIG. 4.

In order to identify the frequency transition during for example the time interval $t_1$ to $t_3$ marked in FIG. 3, it is necessary to observe the behaviour of the input signal during this interval. Although it is not intended that the invention be construed with reference to any particular theory, it is believed that the use of analogue lumped filters, or their digital equivalent, IIR (infinite impulse response) filters, whose output depends on the history of the input for a time which is theoretically infinite (though limited in practice by noise or truncation error), contributes to distortion. The discriminator of FIG. 2 therefore employs finite impulse response filters with a restricted length (i.e. the time difference between the earliest and latest input samples which contribute to one sample output from the filter). Preferably the length is less than twice the symbol period, and more preferably is approximately equal to the symbol period; for example, for the V23 figures quoted above, an 8-tap filter might be used.

The principal difference between the discriminator of FIG. 2 and that of FIG. 1B is that the filter coefficients deviate from the sine/cosine forms mentioned in the introduction by a modification function R. Thus in FIG. 2 the higher frequency is handled by filters 12, 13, having tap coefficients.

$$a_{Hk} = r_{Hk} \sin(2\pi f_H k/f_s + \phi_H) \quad (1)$$

$$b_{Hk} = r_{Hk} \cos(2\pi f_H k/f_s + \phi_H) \quad (2)$$

where k is the tap number. $\phi_H$ is an arbitrary phase shift which can be zero but can be chosen to make the argument of the sine and cosine functions zero at the midpoint of the filter (for an even number of taps, this refers to a notional half-tap value), so that, at least in the absence of the modification function, the coefficients are symmetrical (cos) or antisymmetrical (sine) (i.e. for an 8-tap filter $a_1 = \pm a_8$, $a_2 = \pm a_7$ etc.). If the modification is also symmetrical, this can reduce the number of multipliers required. As before, the filter outputs are squared (14, 15) and summed (16).

Filters, squarers and an adder (17-21) are provided in like manner for the low frequency channel, coefficients $a_{LK}$, $b_{LK}$ being given by the above expression, $f_L$, $\phi_L$ being substituted for $f_H$, $\phi_H$—viz:

$$a_{Lk} = Kr_{Lk} \sin(2\pi f_L k/f_s + \phi_L) \quad (3)$$

$$b_{Lk} = Kr_{Lk} \cos(2\pi f_L k/f_s + \phi_L) \quad (4)$$

where K is a scaling factor (which can be unity) such that the output amplitude from the adder 16 for a signal input at $f_H$ is the same as that from the adder 21 for a signal input at $f_L$.

Thus each filter coefficient is modified by a factor $r_{Hk}$ (for the higher frequency filters) or $r_{Lk}$ (for the lower). It is noted that the object of using sine and cosine filters whose outputs are squared and summed is to ensure a constant output at the adder output in response to a continuous input at the relevant frequency and hence the same function $R_H = [r_{Hk}]$ (or $R_L = [r_{Lk}]$) is used for both sine and cosine filters in order to preserve this. The functions $R_H$, $R_L$ used for the upper and lower frequency filters may be the same, but this is not essential.

As will be seen from the examples given below, by selection of a suitable modification function, a significant improvement in the discriminator distortion can be obtained. The reason for this is not known.

When a zero-crossing occurs in the discriminator output, each filter contains portions of input signal at both frequencies $f_H$, $f_L$. The modification function concentrates most of the importance (or tap weight) into the central region of each FIR filter. The concentration ensures that an input frequency transition is tracked quite quickly by the filter system. With no modification function, the transition output is liable to dither about the threshold, giving rise to considerable distortion. An analytical determination of the optimum form of the function has not been found.

Figure 5A:
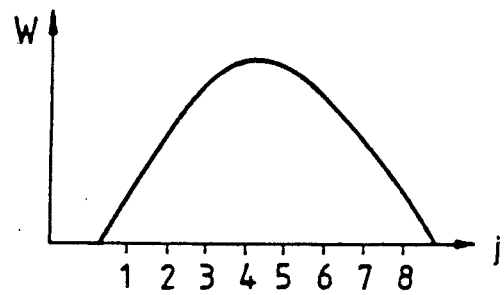
FIGS. 5a, 5b, and 5c, illustrate graphically the form of three possible filter coefficient modification functions.
Figure 5B:
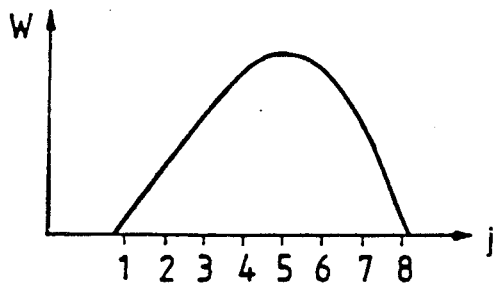
Figure 5C:
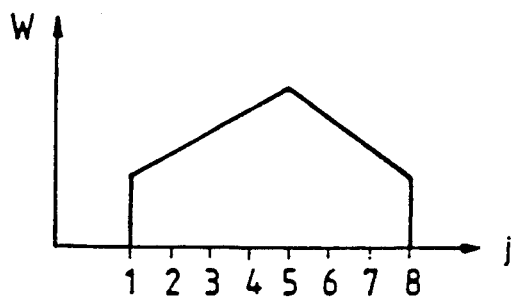

Some functions which have been found useful in practice are illustrated in FIGS. 5a, 5b and 5c (for an 8-tap filter) where it is plotted against tap number k for clarity, these are shown as curves: in fact, of course, $r_k$ exists only for integer values of k. Mathematically expressed:

$$r_k = h_p - (j - 4.5)^2 \text{ (FIG. 5a)} \quad (5)$$

$$r_k = p + \sin \pi j / 9 \text{ (FIG. 5b)} \quad (6)$$

$$r_k = h_t - |j - 4.5| \text{ (FIG. 5c)} \quad (7)$$

It is thought desirable that the functions be substantially symmetrical about the filter mid-point, which is intuitively consistent with the fact that they have to discern transition from $f_H$ to $f_L$ and from $f_L$ to $f_H$; however, the optimisation methods discussed do produce a degree of asymmetry. It is noted to that the functions of FIG. 5a show a monotonic increase from k=0 to the filter mid-point; this also appears to be a desirable feature, but a quite different shape is found to be preferable where certain types of receive filters (i.e. a filter at the discriminator input) are employed.

Figure 4:
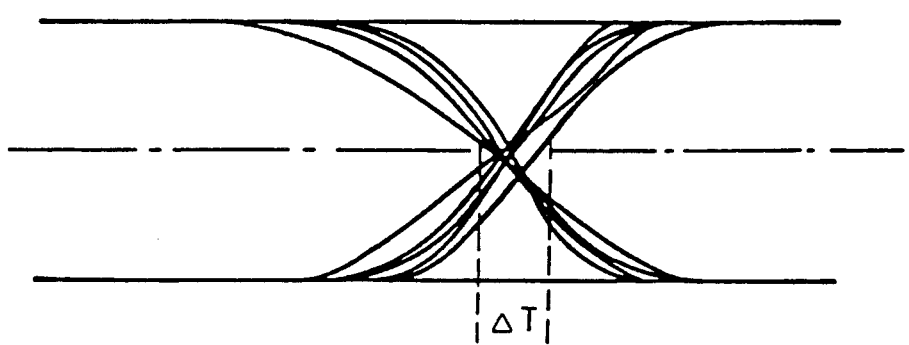
FIG. 4 illustrates a typical eye diagram.

The output at this point is still in the form of digitally coded samples representing a waveform of the type shown in FIG. 4. The zero-crossing can be identified by identifying a sign-change in the samples; however this fixes the zero-crossing only to an accuracy of $\pm$ half the sampling period ($\pm 6.75\%$ in this case) which for many applications is inadequate. A second possibility would be to use a digital to analogue converter, with a filter to remove components at $f_s$ followed by a thresholding circuit as in the case of FIG. 1. However, the preferred option is to employ an interpolator 22 which interpolates (e.g. linearly) between the sample values on either side of the zero crossing, to fix the zero-crossing more precisely.

An example of a filter, with results obtained by a computer program will now be described.

EXAMPLE I

The discriminator had the form of FIG. 2, with the omission of the filter 6, for 1200 baud with $f_H=2100$ Hz, $f_L=1300$ Hz, $f_s=9600$ Hz. No receive filter was used. 8-tap filters were employed, as defined by equations (5) to (8), with $K=1$.

Figure 5:
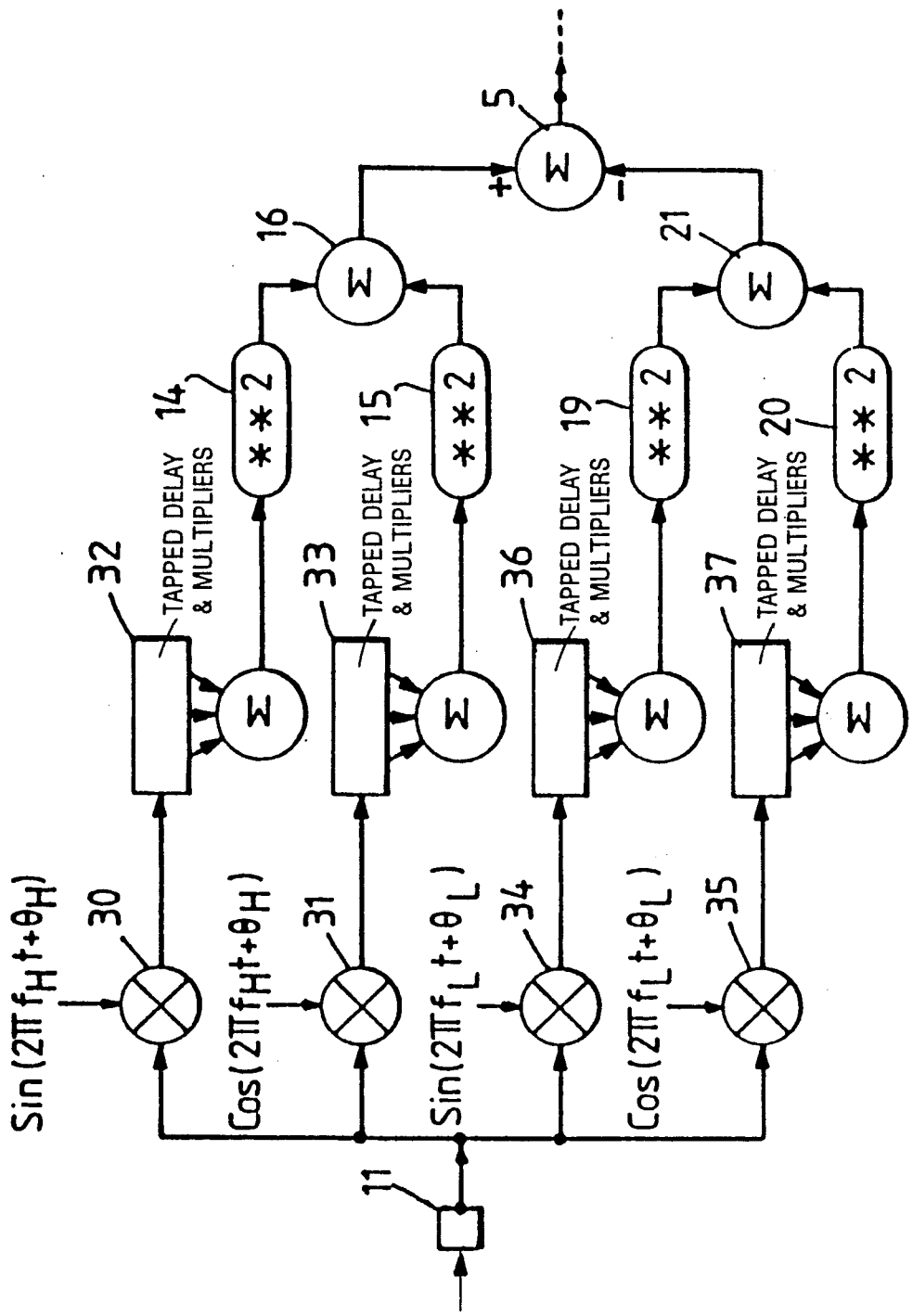
FIG. 5 illustrates an alternate embodiment of the present invention.

Modification functions according to FIG. 5 were used (the same for all four filters).

Discriminator 1: $r_k=1$
Discriminator 2: $r_k=17.2-(k-4.5)^2$
Discriminator 3: $r_k=-0.9+\sin \pi k/9$
Discriminator 4: $r_k=4.1-|k-4.5|$ The interpolator 22 carried out a linear interpolation between the samples flanking the zero-crossing, using floating point numbers with 9 decimal digit accuracy.

Results were as follows, using an input signal modulated with a 63 bit pseudo-random sequence.

Discriminator 1: Distortion=16.394%
Discriminator 2: Distortion=1.168%
Discriminator 3: Distortion=0.961%
Discriminator 4: Distortion=0.390%

As mentioned above, an optimisation procedure may be applied to the functions. Suppose a function as defined by equation 11 is to be used as the starting point. This function has only one degree of freedom ($h_t$) and $h_t$ can be varied on a trial and error basis to minimise distortion. A simple optimisation method for the coefficients $r_k$ can then be iteratively adjusted, as follows:

(i) adjust (in separate tests) each $r_k$ by a small amount in both directions (e.g. ±10%).

(ii) if any of those sixteen tests (for an 8-tap filter) results in improvement, retain that one change which gives the biggest improvement as the new value for the relevant term.

(iii) repeat (i) and (ii) until no further improvement is obtained.

If desired the process can be repeated for a smaller increment/decrement.

This process will be illustrated by a further example.

EXAMPLE II

Figure 6:
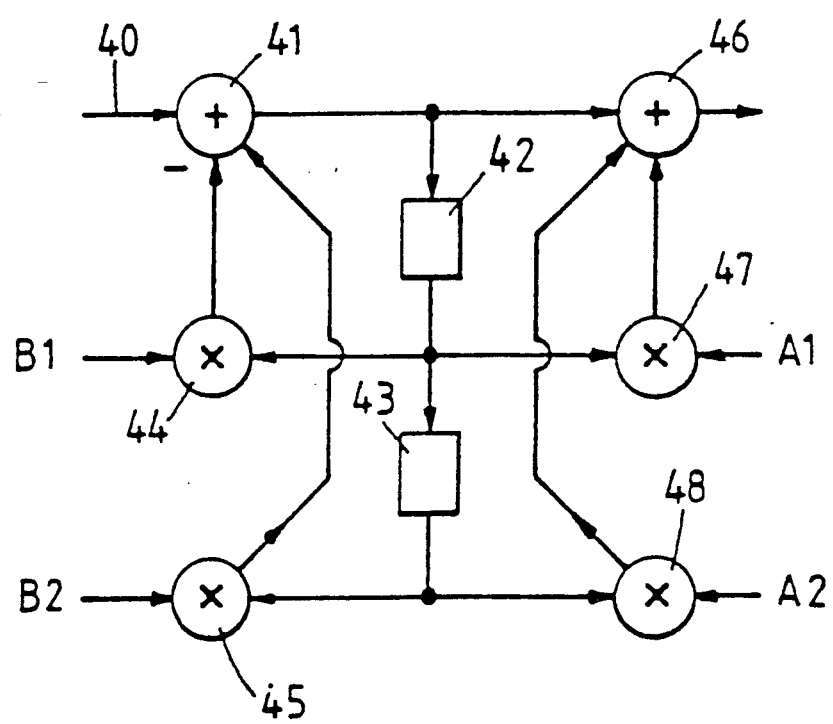
FIG. 6 illustrates graphically one section of a cascaded elliptical pre-filter as used in Example II in the specification.

The discriminator had the same form as in example I, except that an elliptic pre-filter was used, defined as follows:

The filter had four sections in cascade. One section is shown in FIG. 6, and has an input 40 for the input signal or the output of the preceding section. An adder 41 has an output which feeds two delay stages 42, 43 whose outputs are multiplied in multipliers 44, 45 by coefficients B1, B2. The inputs to the adder 41 are the input 40, and the outputs of the two multipliers. The section output (to the next section or to the discriminator) is formed by an adder 46 whose three inputs are the output of the adder 41 and the outputs of two multipliers 47, 48 in which the outputs of the delay stages 42, 43 are multiplied by coefficients A1, A2.

The values of the coefficients (where A2(3) indicates coefficient A2 for the third section, etc.) were A1(1)=0.528102: A2(1)=1: B1(1)=−0.24946:
B2(1)=0.46491
A1(2)=−1.74852: A2(2)=1: B1(2)=−1.14611:
B2(2)=0.59096
A1(3)=1.423245: A2(3)=1: B1(3)=0.10045:
B2(3)=0.84652
A1(4)=−1.92382: A2(4)=1: B1(4)=−1.55017:
B2(4)=0.90748

With $r_k$ defined by equation 11, the optimum value of $h_t$ was found to be 4.8 (i.e. $r_k=4.8-|k-4.5|$) with a distortion of 6.9%. These $r_k$ were then used as starting points in the optimisation process as described above (±10% changes only), which gave an improvement to 3.774% distortion. The corresponding values for $r_k$ were:

| k | 1 | 2 | 3 | 4 | 5 | 6 | 7 | 8 |
|---|---|---|---|---|---|---|---|---|
| $r_k$ | 1.0059 | 2.6225 | 3.3 | 4.3 | 4.3 | 3.3 | 2.3 | 1.0059 |

Tests were also conducted with a post-detect filter 6, which was a fourth order FIR filter for rejecting tones at 2600 Hz and 4200 Hz (twice the signalling frequencies). The filter transfer function was $(z^2+0.26105z+1)(z^2+1.84776z+1)$ Optimisation with the filter in place gave a final distortion of 3.633%.

Where a discriminator is to be used for a lower as well as a high baud rate, with lower keying frequencies (e.g. for a backward signalling channel as in V23) it is convenient to employ the same sampling rate. However, assuming the same filter order, this can result in an undesirably short filter relative to the keying frequency and therefore a modified version of the discriminator provides for sub-sampling the signal, so that the effective filter length is increased. Thus, a switchable rate device 100 may be used to switch between a first mode for a relatively higher baud rate employing relatively higher keying frequencies and a second mode for a relatively lower baud rate employing relatively lower keying frequencies so as to provide means operable in the second mode to subsample the signal to be demodulated before it is applied to the filters.

FIG. 5 shows an alternative embodiment of the invention. Those components which are the same as those in FIG. 2 are given the same reference numerals.

The difference between FIGS. 2 and 5 is that instead of employing a pair of FIR filters (12, 13) which both provides the necessary phase quadrature frequency discrimination by multiplying the signal samples by coefficients which are sine or cosine functions of filter tap position and imposes the desired modification function by modifying those coefficients, the first of these requirements is met by a pair of multipliers 30, 31 in which the input signal is multiplied by respective phase quadrature reference signals at frequency $f_H$ from suitable source (not shown), viz.

$$\sin (2\pi f_H t+\phi_H) \tag{8}$$

$$\cos (2\pi f_H t+\phi_H) \tag{9}$$

where $\phi_H$ is an arbitrary constant.

The second requirement is met by FIR filters 32, 33 which follow the multipliers 30, 31 and differ from the filters 12, 13 of FIG. 2 only in that their coefficients now are determined only by the modification function -i.e.

$$a_{Hk}=b_{Hk}=r_{Hk} \tag{10}$$

It will be apparent of course that if the amplitudes of the multiplying signals were different, this could be corrected by varying the ratio of $a_{Hk}$ to $b_{Hk}$ ($a_{Hk}/b_{Hk}$ being the same for all k) or vice versa, provided that the overall gain in the two paths is the same.

The filter outputs and squared and summed, as before. Although the filter outputs themselves are not the same as in FIG. 2, it can be shown that the output of the adder 16 is the same—i.e. the two arrangements are mathematically identical (although in practice in a digital implementation there may be small differences due to the use of finite precision arithmetic).

The lower channel is modified in similar manner, with multipliers 34, 35 for multiplying by sin $(2\pi f_L t + \phi_L)$ and cos $(2\pi f_L t + \phi_L)$ and filters 36, 37 with coefficients $a_{LK} = b_{LK} = kr_{LK}$.

Although the invention has been described in terms of a 2 fsk discriminator, it may of course be applied to 3 fsk (or higher order) systems by inclusion of an appropriate number of filter arrangements and suitable "majority decision" circuitry.

We claim:

1. A discriminator for frequency shift keyed signals comprising:

first filter means for accepting a first keying frequency, second filter means for accepting a second keying frequency, and a subtractor for generating the difference between the outputs of the filter means, each filter means comprising a pair of finite impulse response filters for accepting signal components which are mutually in phase quadrature and means for forming the sum of an even function of the output of each of the two filters of the pair, characterised in that each filter response is defined by a set of coefficients and the filters of the first pair have coefficients $a_{Hk} = r_{Hk} \sin (2\pi f_H k/f_s + \phi_H)$ $b_{Hk} = r_{Hk} \cos (2\pi f_H k/f_s + \phi_H)$ and those of the second pair $a_{Lk} = Kr_{Lk} \sin (2\pi f_L k/f_s + \phi_L)$ $b_{Lk} = Kr_{Lk} \cos (2\pi f_L k/f_s + \phi_L)$ where k is the coefficient number, $f_H$ and $f_L$ are substantially equal to the keying frequencies, $\phi_H$ and $\phi_L$ are constants, $f_s$ is the sampling frequency at which the first and second keying frequencies are sampled, K is a normalising factor and $r_{Hk}$, $r_{Lk}$ are sets of values, for the respective pairs, representing a modification function.

2. A discriminator according to claim 1 characterised in that the first set of values $r_{Hk}$ for the first pair is the same as that $r_{Lk}$ for the second pair.

3. A discriminator according to claim 1, in which the constants $\phi_H$, $\phi_L$ are such that the arguments of the sine and cosine functions are zero at the mid-point of the filter.

4. A discriminator according to claim 1 further comprising a switching means for switching between a first mode for a relatively higher baud rate employing relatively higher keying frequencies and a second mode for a relatively lower baud rate employing relatively lower keying frequencies and includes means operable in the second mode to subsample the signal to be demodulated before it is supplied to the first and second filter means.

5. A discriminator according to claim 1, characterised in that the or each modification function is substantially symmetrical about the mid-point of its associated finite impulse response filter.

6. A discriminator according to claim 1, characterised in that the or each modification function has been derived by an iterative adjustment procedure such as to reduce distortion in an output of the subtractor.

7. A discriminator according to claim 1, in which the even function is the square.

8. A discriminator according to claim 1, characterised in that the filters have an impulse response of duration less than twice the symbol period of the signal to be demodulated.

9. A discriminator according to claim 1, characterised in that the filters have an impulse response of duration substantially equal to the symbol period of the signal to be demodulated.

10. A discriminator according to claim 1, including an interpolator for interpolating between successive samples output from the subtractor which are of different sign, to determine a zero-crossing instant.

11. A discriminator for frequency shift keyed signals comprising first filter means for accepting a first keying frequency, second filter means for accepting a second keying frequency, and a subtractor for generating the difference between the outputs of the filter means, characterised in that each filter means comprises:

a pair of multipliers;

means for supplying to the multipliers of the pair reference signals, mutually in phase quadrature, at the keying frequency which that filter means is to accept;

two finite impulse response filters having the same coefficients, representing a modification function, each multiplier having an output connected to the input of one of said finite impulse response filters; and means for forming the sum of an even function of the output of each of the two finite impulse response filters.

12. A method for discriminating frequency shift keyed signals, comprising the steps of:

sampling a frequency shift keyed signal including at least first and second keying frequencies;

performing an analog-to-digital conversion of successive samples of said signal to provide a succession of digital signals;

feeding said digital signals in parallel through first and second pairs of multipliers, wherein said first pair of multipliers multiplies said digital signals by a pair of reference signals, mutually in phase quadrature, at said first keying frequency; and wherein said second pair of multiplier multiplies said digital signals by a pair of reference signals, mutually in phase quadrature, at said second keying frequency;

feeding the output of each multiplier to a separate finite impulse response filter, wherein both filters are connected to be fed by said first pair of multipliers having the same coefficients representing a modification function and wherein both filters are connected to be fed by said second pair of multipliers having the same coefficients representing a modification function;

generating a sum of an even function of the output of each of the two filters connected to be fed by each said pair of multipliers; and generating a difference between said sums.

13. A discriminator for frequency shift keyed signals comprising:

first filter means for accepting a first keying frequency, second filter means for accepting a second keying frequency, and a subtractor for generating the difference between the outputs of the said filter means, wherein each filter means comprises:

first means arranged to produce a first set of signals each of which at any instant is the product of (a) the input signal delayed by a respective amount, and (b) a first sinusoidal function, corresponding to the respective keying frequency, of the said delay amount, and (c) an additional function of the said delay amount, and to produce the sum of said signals;

second means arranged to produce a second set of signals each of which at any instant is the product of (a) the input signal delayed by a respective amount, and (b) a second sinusoidal function, in phase quadrature to the first, of the said delay amount and (c) said additional function of the said delay amount, and to produce the sum of said signals; and further means for forming the sum of an even function of the output of each of the said first and second means.

14. A method for discriminating frequency shift keyed signals, comprising the steps of:

sampling a frequency shift keyed signal including at least first and second keying frequencies;

performing an analog-to-digital conversion of said sampled signal to provide a succession of digital signal samples;

feeding said digital samples in parallel through first and second pairs of finite impulse response filters;

wherein said first pair of filters accepts signal components of said first keying frequency which are mutually in phase quadrature;

wherein said second pair of filters accepts signal components of said second keying frequency which are mutually in phase quadrature;

wherein each filter response is defined by a set of coefficients and the first pair of filters have coefficients:

$$a_{Hk} = r_{Hk} \sin(2\pi f_H k/f_s + \phi_H) \text{ and}$$

$$b_{Hk} = r_{Hk} \cos(2\pi f_H k/f_s + \phi_H)$$

and the second pair of filters have coefficients:

$$a_{Lk} = K r_{Hk} \sin(2\pi f_L k/f_s + \phi_L) \text{ and}$$

$$b_{Lk} = K r_{Lk} \cos(2\pi f_L k/f_s + \phi_L),$$

where k is the coefficient number, $f_H$ and $f_L$ are substantially equal to the keying frequencies, $\phi_H$ and $\phi_L$ are constants, $f_s$ is the sampling frequency at which said first and second keying frequencies are sampled, K is a normalising factor and $r_{Hk}$, $r_{Lk}$ are sets of values, for the respective pairs, representing a modification function;

generating the sum of an even function of the outputs of each of the filters of each said pair; and generating a difference signal between said sums.

* * * * *